July 7, 1953

C. G. SENIF 2,644,600

WALL BOX AND BRACKET

Filed May 9, 1950

INVENTOR.
CHARLES G. SENIF
BY
*John H. Hanrahan*
ATTORNEY

Patented July 7, 1953

2,644,600

UNITED STATES PATENT OFFICE 2,644,600

WALL BOX AND BRACKET

Charles G. Senif, Rome, N. Y.

Application May 9, 1950, Serial No. 160,959

7 Claims. (Cl. 220—3.9)

This invention relates to new and useful improvements in wall or outlet boxes which are used in the electrical wiring of buildings, etc., for the housing of electrical receptacles, switches and the like, and has particular relation to a box and a bracket for the mounting of such box.

An object of the invention is to provide an outlet box and a mounting bracket, the box and bracket including cooperating means whereby the box may be easily and conveniently adjusted on the bracket to locate the box whereby its front or open side will be flush with or in other desired relation to the finished surface of a wall when the latter is installed.

A further object of the invention is to provide a box and bracket having the characteristics indicated and including cooperating parts whereby the bracket may be attached to the studding of a building and thereafter the box mounted on the bracket and adjusted to the proper location.

Another object is to provide a box and supporting bracket structure including means whereby after an installation the box may be removed from the bracket for the changing of wiring or the like and then remounted on the bracket, the latter being left in place on the studding of the building structure.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Referring in detail to the drawing.

Figure 1:
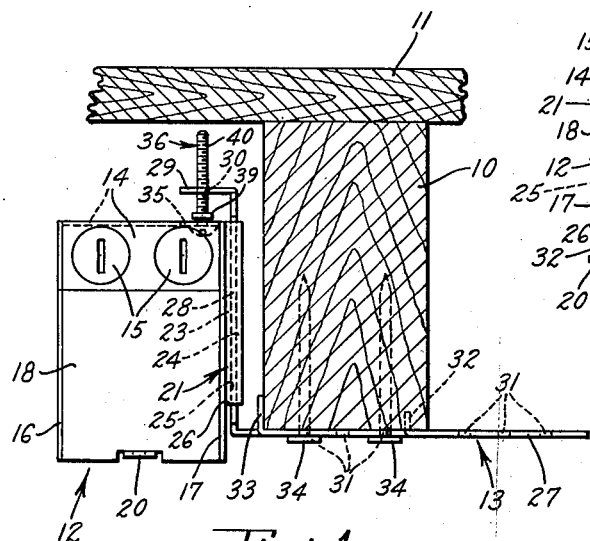
Fig. 1 is a top plan view of the improved bracket and box, the bracket being secured to a stud of a building.
Figure 3:
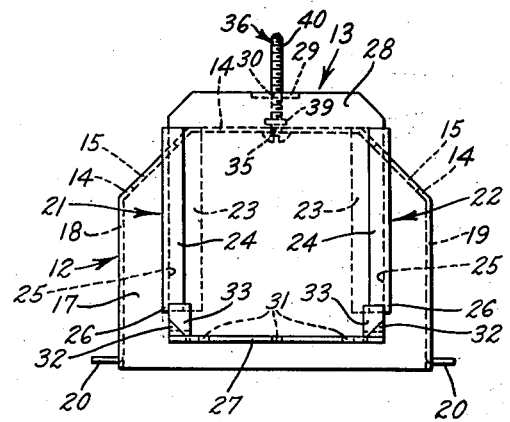
Fig. 3 is a side view of the bracket and box assembled.

Referring in detail to the drawing, at 10 is shown a portion of a stud of a building, which stud may be a 2 x 4 or the like, and against one edge of said stud is a wall sheathing or the like 11. The outlet box or wall box and the mounting bracket of the invention are respectively generally designated 12 and 13.

The box 12 may be of the desired type or style as the invention is equally applicable to a standard box, a deep box or a square box. The box 12 is of standard construction and of sheet metal. It includes a bottom wall 14, portions of which are angularly arranged, having a series of knockouts 15 therein. Then the box includes opposite side walls 16 and 17 and end walls 18 and 19. On the end walls are any of the usual receptacle or switch lugs 20.

Fixed on the outer surface of side wall 17 are a pair of elongated spaced parallel bracket track or guide members 21 and 22. These members are formed of pieces of sheet metal preferably of the gauge of the stock used in fabricating the box 12. Such pieces of metal are folded upon themselves whereby they are substantially U-shaped in transverse section providing inner and outer portions 23 and 24 of unequal widths but defining between them a way 25. Members 21 and 22 are arranged in spaced parallel relation with their inner portions 23 secured against the outer surface of the side wall 17 of the box and preferably the mentioned portions of the members are spot welded to the box wall although they may be otherwise secured if so desired.

The members 21 and 22 have their inner portions 23 secured to the box wall and thus their ways 25 are in opposed relation with their open edges facing one another whereby the members define a pair of tracks or guides. These tracks or guides are relatively long but it is noted that their forward ends 26 are spaced inwardly a substantial distance from the front edge of the box providing a clearance for a purpose that will be fully set forth.

Bracket 13 is preferably blanked and formed of sheet metal. It is generally L-shaped and includes arms 27 and 28 at right angles to one another and the arm 28 carries an ear or lug 29 at its inner end and normal thereto. Thus, lug or ear 29 is substantially parallel with the bracket arm 27 but it is noted that such lug or ear extends from the side of the bracket arm 28 opposite that from which the arm 27 extends. Through the lug or ear 29 is a tapped opening 30.

Bracket arm 27 has a series of holes 31 therethrough for the passage of nails or other fastening means. Then at each longitudinal edge the arm 27 has a sharp, pointed substantially triangularly shaped barb 32 lanced and pressed therefrom and extending normal thereto. In its portion adjacent arm 28, the arm 27 has small corner lugs 33 lanced and pressed therefrom. These lugs are normal to the arm and of equal length and are integral with the arm 27 at their inner ends but are lanced or cut from the arm 28 at their outer ends.

These lugs 33 serve four purposes which will later be better understood. The first of such purposes is to provide clearance for the tracks or guide members 21 and 22 on the box. Second, these lugs act as braces against any strain placed on the bracket when it is in use. Third, they serve to align the bracket with a stud; and fourth, they serve to space the track or guide members 21 and 22 from a stud whereby the track may slide along the bracket arm 28 without rubbing or binding against a stud.

When making an installation, the bracket alone is fastened in the desired position against the face of a stud. It is not necessary to saw or notch the stud as the bracket is merely fastened against the front edge or face of the stud. In doing this, the lugs 33 are placed against the side of the stud to properly locate the bracket and align it with the stud and then the spurs or barbs 32 against the face of the stud are driven into the latter. These barbs or spurs 32 are so spaced along the bracket arm 27 from the lugs 33 as to be driven into a 2 x 4 against an edge of which the lugs are engaged. This provides a temporary holding of the bracket in place until it is thereafter fastened by nails driven through any of the openings 31 into the stud. In the drawing I have illustrated the use of only two such nails, these being designated 34.

Figure 2:
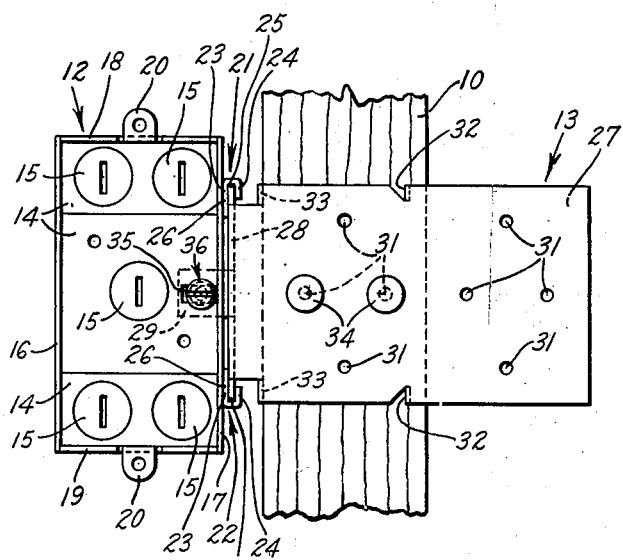
Fig. 2 is a front elevational view of the bracket and box, the bracket being fastened to a stud.
Figure 4:
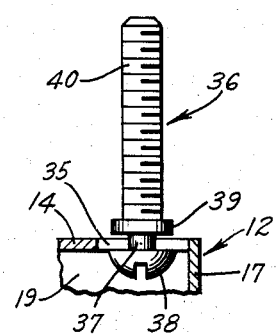
Fig. 4 is a detailed sectional view showing the mounting of the adjustment screw on the box.
Figure 5:
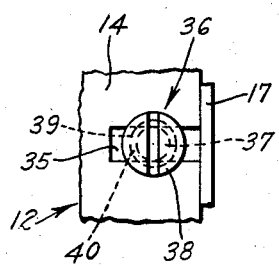
Fig. 5 is a front elevational view of Fig. 4.

On a vertical stud, the bracket can be placed in several different positions owing to the length of the arm 27. That is, it can be positioned as shown in Figs. 1 and 2 or it can be located to dispose its arm 28 in more spaced relation to the side of the stud. Thus, the bracket arm 27 may have its free end portion against the face of the stud and nailed thereto. In this connection it will be seen that if the free end of arm 27 is flush with an edge of the stud 10 the barbs or spurs 32 will be against a face of said stud. Additionally, the bracket arm may be nailed to a horizontal stud to support an outlet box below the stud or above the same as may be desired.

After the bracket has been nailed in place, the box 12 is positioned on the bracket. Here it is noted that through the bottom wall 14 of the box there is a slot 35 opening through one edge of the wall but closed at such edge by the box side wall 17. An adjusting screw 36 has an unthreaded and preferably reduced diameter portion 37 between its head 38 and a collar 39 rigid with the screw and located at the inner end of the threaded shank portion 40 of the latter.

The screw is mounted on the box by locating the portion 37 of the screw in the slot 35 in the bottom wall of the box and then mounting the side wall of the box. Alternatively, this side wall 17 could be pried outwardly and after the screw is mounted, flattened back into place. Any other manner of mounting the screw on the box may be employed. With the screw positioned as described, it will be apparent that the screw may rotate relative to the box but has no longitudinal movement relative to the box although the screw may float laterally within the limits defined by the ends of the slot 35.

With the bracket mounted on a stud and the screw assembled with the box, the box is slid into place on the bracket. This is accomplished by aligning the inner ends of the ways 25 of the members 21 and 22 with the forward end of the bracket arm 28 and then sliding the box inwardly on the track provided by said arm. The ears or lugs 33 having been lanced and pressed from the bracket arm 27, clearance is provided for the overhanging portions or the outwardly outer portions 24 of the members 21 and 22. The relationship provided by this clearance is best illustrated in Fig. 2 of the drawing.

As the box is moved inwardly on the bracket arm 28, the inner end of the threaded shank 40 of screw 36 engages the ear or lug 29. The screw is aligned with the tapped opening 30 through the mentioned ear or lug and is threaded into and through such opening. Now, since the screw cannot move longitudinally relative to the box for any adjustment, it is merely necessary to insert a screw driver into the box to engage the head of the screw and then rotate the screw in one direction or the other until the front end of the box is in the desired location.

The box may be moved backward and forward on the bracket arm 28 depending upon the direction of rotation of the screw 36. Usually this initial adjustment will be such as will be most convenient for the electrician in later connecting his wires. Thereafter, the electrician will make some temporary adjustment in accordance with the size of wallboard being used or the lathe and plaster, etc. After the wall is completed and the installation of the switch or receptacle or the like in the box is to be made, the electrician makes final adjustment of the box by turning screw 36. In this adjustment, he brings the box into a position where its front edge is flush with the wallboard or plaster of the finished wall. All of the adjusting is accomplished through rotation of the screw 36. The adjustment is free and easy as the box slides on the track provided by the bracket arm 28 and this arm always holds the box in proper aligned position.

The box being properly positioned and wiring completed in the box, the switch or receptacle plate is put on in the usual manner and it completely seals the front end of the box. This provides a tight job, free of fire risks such as may occur when a fixed type box is used and the switch or receptacle is washered or shimmed out and held by long screws so as to bring the receptacle flush with the outer surface of the finished wall. When washers or shims are used as indicated, there is an open space left between the box and the wallboard or other wall material where the wires are exposed providing a fire hazard. In addition, this building up of thickness by washers or shims consumes the time of the mechanic.

It is also pointed out that the members 21 and 22 being set back from the front edge of the box there is the clear space previously mentioned between the forward ends of said member and the forward ends of the box. This enables the carpenter to get a close, neat fit all along the face of the box in putting up the wallboard. This space is always clear in any and all adjusted positions of the box.

In connection with my improved structure it is noted that I have made no change in the fabrication of the box except the provision of the slot 35. The members 21 and 22 are preferably spot welded to the box and serve to reinforce its wall 17 providing a strong sturdy structure. Whether one box is used or a gang of boxes the cutting of slots into the box for the purpose of adjustment is avoided and thus weakening or warping of the box is avoided.

It is here noted that the track or guide members 21 and 22 are preferably of the same gauge of metal as that of the box whereby all parts are substantial and of equal strength. It is also noted that owing to the length of the members 21 and 22 and of the bracket arm 28, the box is fully supported in all directions. There is always a substantial amount of engagement between the bracket arm and the track members or a substantial overlapping of these parts.

The disclosed structure possesses many advantages. It will be understood that the boxes and brackets may be shipped as separate articles and thus may be packed so that many of them occupy but a small space. They are easily assembled at the job and, in fact, all brackets may be located before the boxes are mounted. The boxes are easily and quickly mounted on the brackets and easily and quickly adjusted to the exact positions desired.

Having thus set forth the nature of my invention, what I claim is:

1. An outlet box mounting bracket comprising first and second right angularly related arms, an ear projecting from the outer side of the free end of the first of said arms in substantially parallel relation to the second arm, said ear having a tapped opening therethrough, and a pair of lugs lanced from opposite edges of said second arm at its juncture with the first arm and folded away from the first arm in spaced parallel relation thereto and rigid with and substantially normal to the second arm.

2. In an outlet box structure, a right angle mounting bracket for attachment to a building stud of rectangular cross-section, comprising a flat fastening arm adapted for flat engagement with and fastening to a face of said stud, lug means carried by said fastening arm extending inwardly at right angles thereto in spaced relation to an end of said arm for bracket-positioning engagement with a side of said stud whereby said end of said arm is spaced from said side of said stud, a flat outlet box mounting arm extending inwardly at right angles from said end of said fastening arm in spaced parallel relation to said lug means whereby said mounting arm is positioned by said lug means in predetermined spaced parallel relation to said side of said stud, said mounting arm having parallel upper and lower edges, said fastening arm adjacent its junction with said mounting arm having its upper and lower edges respectively downwardly and upwardly spaced from said upper and lower edges of said mounting arm whereby said mounting arm presents upper and lower marginal guideway edge portions including forward exposed edges respectively extending downwardly and upwardly from said upper and lower edges, and an ear at the inner end of said mounting arm midway between said marginal edge portions extending at right angles thereto in opposite direction from said fastening arm and having a threaded screw receiving hole, and an outlet box of rectangular form having a bottom wall and side walls, one said side wall having upper and lower spaced parallel flanged guide members projecting therefrom and defining vertically opposed grooves slidably receiving said upper and lower marginal edge portions of said mounting arm, said guide members defining an open ended space of greater width than the width of said fastening arm adjacent its junction with said mounting arm through which said box may be slideably engaged with and disengaged from said mounting arm, and a screw rotatably mounted on the bottom wall of said box and engaged with said screw receiving hole of said ear whereby on rotation of said screw the outlet box may be fed inwardly and outwardly on said mounting arm.

3. The invention as defined in claim 2 further characterized in that said lug means comprises a pair of lugs respectively lanced from the upper and lower marginal edge portions of said fastening arm adjacent its junction with said mounting arm disposed in laterally opposed spaced parallel relation to said upper and lower marginal edge portions of said mounting arm, there being clearance spaces in said fastening arm between said lugs and the forward ends of said upper and lower marginal edge portions of said mounting arm through which said flanged guide members are adapted to pass.

4. The invention as defined in claim 2, further characterized in that said guide members have their forward ends rearwardly spaced from the forward end of said box.

5. A wall outlet box having a bottom wall and a flat side wall, a pair of horizontal guide members projecting from the outer surface of said wall, each having a right angle flange outwardly spaced from said wall and providing between said flange and said wall a horizontal groove, and said guide members arranged in vertically spaced parallel relation with their flanges vertically aligned and extending toward one another, and the vertical space between said members being open at its ends for horizontal engagement and disengagement of a parallel edged bracket with said grooves, and a screw rotatably mounted on said bottom wall of said box contiguous to said side wall and midway between said horizontal guide members with its axis parallel to said grooves for imparting relative adjustment to said box relative to said bracket longitudinally of said grooves.

6. An outlet box right angle mounting bracket for attachment to a building stud of rectangular cross section, comprising a flat fastening arm adapted for flat engagement with and fastening to a face of said stud, lug means carried by said fastening arm extending inwardly at right angles thereto in spaced relation to an end of said arm for bracket positioning engagement with a side of said stud whereby said end of said arm is spaced from said side of said stud, a flat outlet box mounting arm extending inwardly at right angles from said end of said fastening arm in spaced parallel relation to said lug means whereby said mounting arm is positioned by said lug means in predetermined spaced parallel relation to said side of said stud, said mounting arm having parallel upper and lower edges, said fastening arm adjacent its junction with said mounting arm having its upper and lower edges respectively downwardly and upwardly spaced from said upper and lower edges of said mounting arm whereby said mounting arm presents upper and lower marginal guideway edge portions including forward exposed edges respectively extending downwardly and upwardly from said upper and lower edges, and an ear at the inner end of said mounting arm midway between said marginal edge portions extending at right angles thereto in opposite direction from said fastening arm and having a threaded screw receiving hole.

7. The invention as defined in claim 6 further characterized in that said lug means comprises a pair of lugs respectively lanced from the upper and lower marginal edge portions of said fastening arm adjacent its junction with said mounting arm disposed in laterally opposed spaced parallel relation to said upper and lower marginal edge portions of said mounting arm, there being clearance spaces in said fastening arm between said lugs and the forward ends of said upper and lower marginal edge portions of said mounting arm.

CHARLES G. SENIF.

References Cited in the file of this patent

UNITED STATES PATENTS

| Number | Name | Date |
|---|---|---|
| 989,854 | Kruse | Apr. 18, 1911 |
| 1,026,164 | Hoffmann | May 14, 1912 |
| 1,133,946 | Farrell | Mar. 30, 1915 |
| 1,207,705 | Bonnell | Dec. 12, 1916 |
| 1,453,017 | Lundelof | Apr. 24, 1923 |
| 1,782,546 | Newman et al. | Nov. 25, 1930 |
| 1,791,311 | Hamblin | Feb. 3, 1931 |
| 1,795,224 | Mangin | Mar. 3, 1931 |
| 2,095,914 | Brown | Oct. 12, 1937 |
| 2,233,548 | Mroziak | Mar. 4, 1941 |
| 2,440,324 | Blakeslee | Apr. 27, 1948 |